Oct. 2, 1962 P. J. FRICKERT 3,056,711
METHOD OF PRODUCING A BULK STRAND PRODUCT
INTEGRATED AT SPACED ZONES
Filed Aug. 23, 1957 2 Sheets-Sheet 1
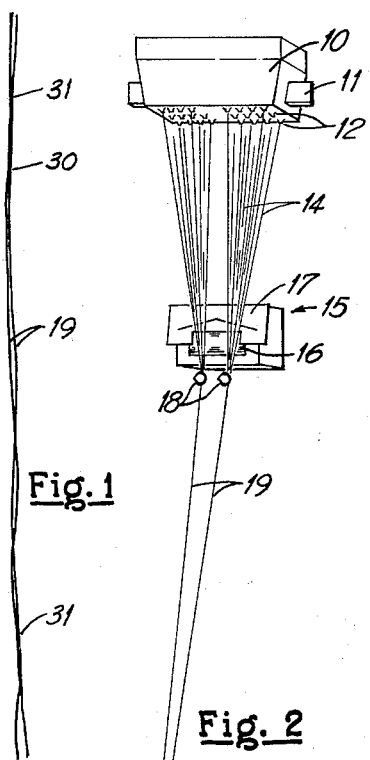
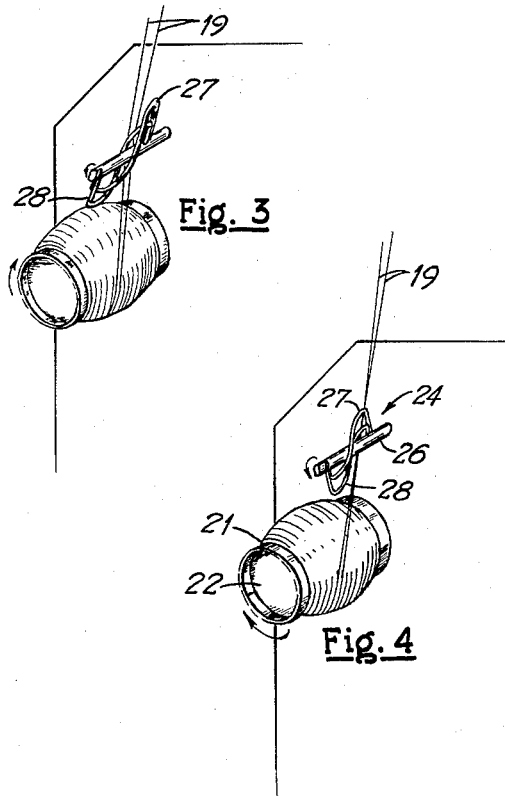
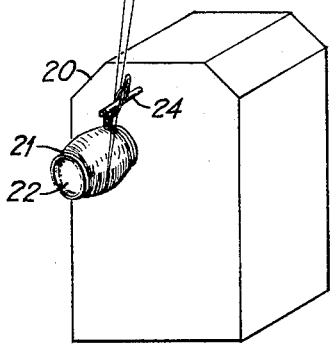
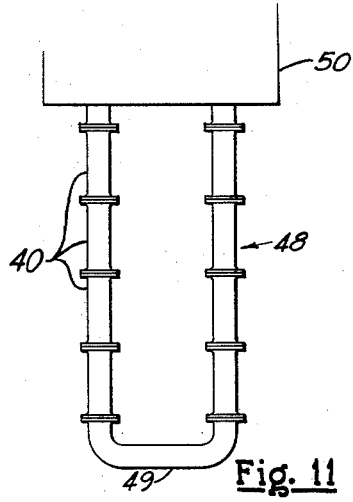
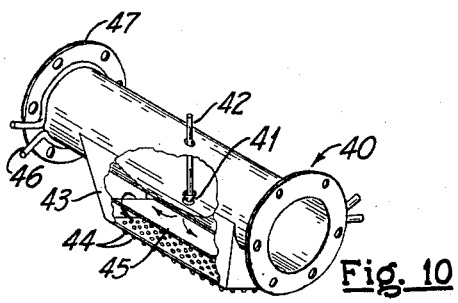
INVENTOR.
PHILIP J. FRICKERT
BY
Staelin & Overman
ATTORNEYS INVENTOR.
PHILIP J. FRICKERT
BY
Staelin & Overman
ATTORNEYS United States Patent Office 3,056,711
Patented Oct. 2, 1962

3,056,711
METHOD OF PRODUCING A BULK STRAND PRODUCT INTEGRATED AT SPACED ZONES
Philip J. Frickert, Anderson, S.C., assignor to Owens-Corning Fiberglas Corporation, a corporation of Delaware
Filed Aug. 23, 1957, Ser. No. 679,881
8 Claims. (Cl. 156—167)

This invention relates to the production of a new continuous strand product, and more particularly to a product comprising a grouping of continuous filaments or small diameter strands of fine texture into a common strand product which although of bulk character still retains the fineness of texture of the filaments or small diameter strands.

In producing laminate structures of materials such as polyester resins reinforced with other materials, for example mineral materials such as glass fibers, or resinous fibers such as polyamide, polyglycol terephthalate, vinylidene chloride, rayon, etc. in forms such as mats of continuous strands, or chopped strands, or either continuous strands and chopped strands dispersed through the matrix material to be reinforced, it is desirable that the reinforcing media be composites or bundles of individual fibers in which the multitude of individual fibers contribute to the strength of the composite. In bundling individual fibers or filaments, however, it is also desirable to have the resulting reinforcing product of fine texture so that upon incorporation in a matrix material it will wet out the product more readily, thereby lending assurance that the matrix will not be lumpy or lack in dispersion of the reinforcing media therethrough. Concentrated masses of reinforcing media such as of fully integrated strand-like forms of fibers grouped in small zones of the laminate result in poor surface appearance of the laminate and concentrate the reinforcement to the extent that often the structure is weak in the non-reinforced zones. Concentrated bundles of fibers or filaments in strand form additionally offer resistance to complete wetting out by the matrix material.

Accordingly, it is an object of this invention to provide a new type of strand product which incorporates a multitude of fibers or filaments providing a high degree of reinforcibility for laminate structures, yet has a fineness of texture characteristic of strand products incorporating a lesser number of individual fibers or filaments.

It is another object of the present invention to provide a method for producing a product of the above type on a continuous basis, preferably in the fiber or filament forming process.

It is a further object of the invention to provide a product capable of production in a continuous fiber forming operation and having the characteristics of a large bundle of continuous fibers divided into smaller bundles throughout the major portion of its length to lend fineness of texture thereto for improved wettability and appearance and adaptability to distribution through laminate products while at the same time permitting rates of production comparable to large diameter products.

It is still another object of this invention to provide a method for producing a new strand product of fine texture and yet of bulk reinforcing form wherein the product is producible at an extremely rapid rate.

A still further object of the present invention is to provide a new strand product of high reinforcing capabilities characteristic of reinforcing media incorporating a multitude of individual fibers or filaments, but yet is a product which although fine in texture and approaching a product of dispersed filamentous form, is adaptable to easy handling such as for chopping and production of reinforcing mats, characteristics of integrated strand-type products.

Another and still further object of the present invention is to provide a strand product having characteristics similar to that formable by splitting a large diameter filamentous strand, yet which is producible without requirement for the actual splitting of such a strand.

In brief, the above objectives are attained according to the principles of the present invention by forming strands of fine texture of accumulations of individual fibers or, in other words, by gathering fibers or filaments into continuous strands of fine texture and of relatively small diameter and then intermittently integrating the plurality of fine strands into a continuous composite product. In another sense, the strand product produced may be considered a plurality of continuous strands of fine diameter combined into a common strand wherein the plurality is bonded into integrated association in spaced zones only.

Features of the invention lie in the ease of production and handleability of the strand product regardless of the fact that the product is made up of a plurality of loosely associated fine textured strands.

Additionally, a feature lies in the efficiency of packageability of the product in that a plurality of small diameter strands joined into a composite which is integrated only at spaced points can be wound and withdrawn from a package in unitary fashion.

Another feature of this invention is the adaptability of the product to ready withdrawal from a package even though a plurality of strands are incorporated therein, and upon being chopped or utilized in continuous form, the resulting accumulation such as in a mat for reinforcing purposes, is of extremely fine texture dependent upon the fineness of diameter of the individual strands incorporated therein.

A further feature of the invention lies in its adaptableness to production with but a slight modification in existing strand forming equipment.

These and other objects and features of the present invention will become more apparent from the following description taken in conjunction with the accompanying drawings in which:

FIGURE 1 is an illustration of a strand product incorporating and made according to the principles of the present invention.

FIGURE 2 is a somewhat diagrammatical side elevational view of a strand or filament-producing apparatus by which the method and product of the present invention can be reduced to practice.

FIGURE 3 is an enlarged side elevational view in perspective of the immediate traversing and winding portion of the winding apparatus of FIGURE 2.

FIGURE 4 is a view similar to that of FIGURE 3 with the traverse mechanism in an advanced portion of its cycle of operation.

FIGURE 10 is a perspective view of a feeder unit for producing fibers of glass adaptable to formation of a strand product according to the present invention and;

FIGURE 11 is a plan view of a melting system wherein the feeder unit of FIGURE 10 is adaptable to incorporafor the production of strand products according to the present invention.

Figure 6:
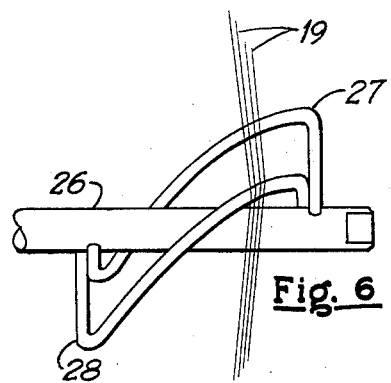
FIGURES 5 and 6 are enlarged end and front elevational views respectively of the traverse mechanism of FIGURES 2 to 4, but traversing a large number of strands and showing the position of the strands in relation to the traverse mechanism in the point of the cycle of operation corresponding to that of FIGURE 3.

Before considering the drawings in detail, it should be pointed out that although the present invention is herein exemplified by reference to production of strands of continuous glass fibers, it will be understood that the invention is not necesarily limited to production of strands products of such material, but that strands of various material such as mineral materials other than glass, as well as synthetic resin materials such as polyamides, polyglycol terephthalate, polyacrylonitrite, vinylidene chloride, vinyl acetate copolymer, vinyl chloride acrylonitrite copolymer, vinyl chloride polymers and copolymers, nylon, rayon, polyethylene, vinyl acrylic fibers can be utilized to produce a product according to the present invention. Other non-adhesive fiber materials lend themsevlves to incorporation in the product of the present invention and natural fiber materials such as wood pulp fibers, cotton, flax, jute, kapok, wool, hair and silk may be utilized; as well as synthetic fibers such as cellulose or cellulose derivative fibers, including cellulose hydrate, cellulose esters, cellulose ethers; natural and synthetic rubber and derivatives thereof; fibers made of alginic acid, gelatine, casein; and mineral fibers such as asbestos, mineral wool and the like; as well as fibers made of natural resins, and fibers and filaments made by slitting, cutting or shredding non-fibrous films, such as waste cellophane. Furthermore, it will be recognized that although continuous fiber strands are herein illustrated as producing strand products according to the present invention, continuous strands of staple or discontinuous fibers can also be processed according to the invention to produce the new strand product.

Turning to the drawings in greater detail, FIGURE 1 illustrates a strand product 30 of the present invention formed of a pair of smaller diameter strands 19, each of which is made up of a plurality of filaments and both of which are integrated only at spaced zones 31.

FIGURE 2 illustrates apparatus by which the product of FIGURE 1 can be produced in the formation of continuous glass fibers. The apparatus incorporates a feeder 10 within which molten glass is melted by electrical power supplied across terminals 11 connected to a power source not shown. The molten glass flows from the feeder through orificed tips 12 to produce a plurality of streams from which fibers 14 are attenuated under the influence of force supplied by a winding unit 20 located below.

The fibers 14 are drawn across a roll type binder or sizing applicator 15 from which sizing fluid is supplied to each individual filament upon its being drawn across a roll 16 projecting therefrom. The roll 16 upon rotation is partially immersed in the sizing fluid contained within the applicator 15 and transfers the sizing fluid from the pool therein to the filaments upon rotation. An apron 17 acts as a guard to cover the major portion of the roll which would otherwise be exposed and thereby limits extraneous materials from being deposited on the roll during rotation.

The filaments drawn from the feeder 10 are herein illustrated as being divided into two groups for formation of two individual small diameter strands. To effect such formation, the two groups of filaments are gathered over individual gathering members 18 made of material such as graphite which will not abrasively affect the glass filaments drawn thereover. The two groups of filaments are gathered into the small diameter strands 19 which in turn are drawn in generally parallel side by side relationship across a traverse mechanism 24 to be wound upon a rotating tube 21 mounted on a collet 22 driven by the winding unit 20.

FIGURES 3 and 4 illustrate the manner in which the pair of strands of FIGURE 2 are wound while in spaced relation for the length of the strands passing over the traverse between reversals of movement in their cycle of reciprocation across the package (see FIGURE 3), and also the manner in which the strands are grouped into a unitary product by integration in zones along the product length in which reversals in the reciprocating movement of the strands are affected (see FIGURE 4).

In other words, the strand product produced comprises a pair of small diameter strands which are only loosely related for a considerable distance along their length and then integrated at spaced zones along the product length where the strands are brought into association with each other corresponding in time to the end of each stroke of movement of the strands in the the back and forth movement therefor distribution in the package upon which it is being wound.

The traversing mechanism effecting the spaced integration of strands herein illustrated is described in considerable detail in the Beech Patent 2,391,870, in which it is pointed out that the traversing movement of strands reciprocated by the mechanism is under the direct control of a pair of substantially spirally shaped complementary cam members. These cam members 27 and 28 are carried by a shaft 26. The members 27 and 28 may be formed of steel wire as illustrated, or any suitable material capable of resisting the wearing action of the strand. Each of the members 27 and 28 extends through slightly more than 180 degrees of a convolution. The inner or lower end of each terminates inside (in an axial direction) of the large diameter end of the complementary cam member and is preferably also overlapped by the enlarged diameter end. Due to the relation of the ends of the cams in axial directions, the strands upon completion of a traverse stroke at the small diameter end of the cam member are in a position to be engaged by the large diameter of the complementary cam, and where the opposed ends of the cams are in overlapping relation as shown, this engagement by the large diameter cam end occurs immediately upon cessation of each traverse stroke. Upon cessation of each traverse stroke of the strands therefore, the strands are caused to be reversed in movement and at the same time to be brought into intimate association with each other for integration by the sizing material.

At the same time that the strands are traversed by the cams 27 and 28, the traverse mechanism is reciprocated, or in other words, is moved longitudinally of the shaft axis to direct the product over a greater length of the tube upon which it is wound, thereby to produce a package in which the central portion of the package is substantially thicker than its ends as shown in FIGURES 2 to 4.

The traverse mechanism described thus far may be rotated at a high peripheral speed, approaching, and sometimes substantially equalling, the linear speed of the strand. Only a slight differential in tension as a result of the traverse is therefore encountered. This causes the strand to be readily traversed along the package at a minimum angle to the axis of the spool.

Figure 5:
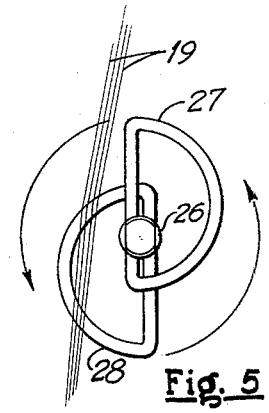
Figure 8:
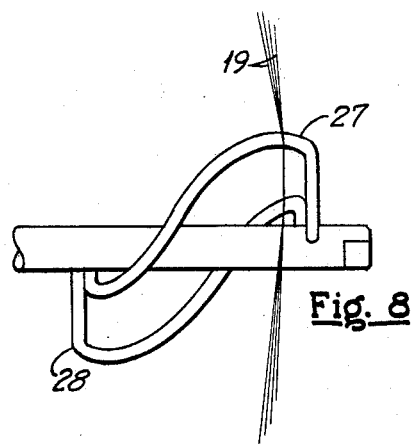
FIGURES 7 and 8 are end and front elevational views respectively of the traverse mechanism of FIGURES 5 and 6 in an advanced position of traverse of the strands corresponding to the point in the cycle of operation illustrated in FIGURE 4.
Figure 7:
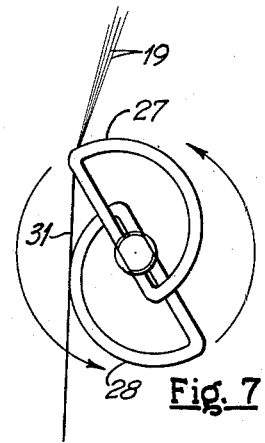

Although the method of producing the intermittently integrated strand product of this invention has hereinbefore been described in relation to formation and gathering of only two strands, it will be recognized that two, three, four and even a much larger number of strands might be wound and intermittently integrated according to the invention. In this respect, FIGURES 5 to 8, by way of example, illustrate with greater clarity the arrangement by which four strands can be passed over a spiral wire traverse mechanism to produce such a product. Strands 19 are drawn over the wire members 27 and 28 as the members are rotated in a counter-clockwise direction on the shaft 26. The strands are held in spaced relationship by reason of the angular engagement of the traverse with the individual strands and their spaced relationship upon introduction to the wire members in this fashion. Upon engagement of the large diameter end of each cam with the strands, however, the strands are grouped together and held in intimate association for the time which it takes to effect a separation thereof by movement of the angular portion of the large diameter end coacting with the forces within the strands providing the tension therein. The angle of the wire members required to effect the separation of the strands between reversal in the traverse cycle is dependent upon the speed of winding, the tension of the strand, the rate of traverse, and the length of traverse, which are readily ascertainable by trial. FIGURES 5 and 6 show the manner in which the strands are held in separated relationship between the reversals of movement in the traverse cycle, while FIGURES 7 and 8 illustrate the manner in which the strands are grouped in intimate relationship upon engagement with each other at the ends of the traverse stroke.

Figure 9:
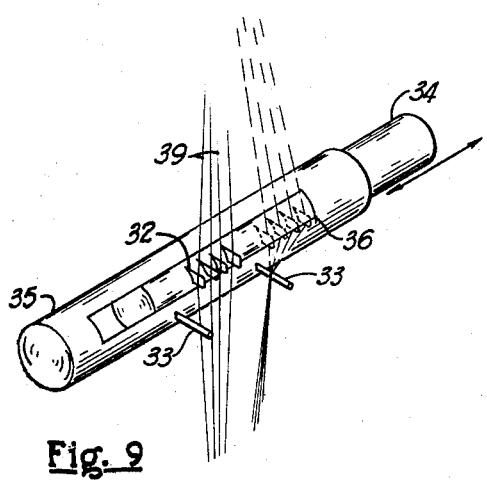
FIGURE 9 is a somewhat schematic, partially cutaway view of another traverse mechanism whereby the present invention can be successfully practiced.

FIGURE 9 ilustrates another traverse mechanism which will effect a production of strand products according to the present invention. In this arrangement, the strands 39 are held separated from each other by a series of fingers 32 extending laterally from a slot in the side of a tubular member within which a two way screw member functions to reciprocate the fingers first to one end of the member from which they extend and then to the other. A pair of terminal members 33 are located a short distance from the ends of the slot 36 and at points short of the full extent to which the fingers 32 move before reversal for start of a succeeding stroke in the cycle of traversal. The terminating members 33 are thus located to effect engagement and a gathering of the strands 39 at each end of the stroke of traversal. Upon disengagement of the strands from the terminal members 33 on each new stroke of traversal, the strands become separated again. Thus, at the end of each stroke in the traverse cycle, the strands are gathered for integration (shown in dotted lines), and in the region between the ends of the stroke of traversal (shown in solid lines), the strands are held in separated relationship to form a loose association thereof in the product.

In utiliizng this or other suitable traversing devices it will be understood that the production of the present product is not necessarily limited to fiber-forming operations, but the method is also applicable to forming the product from strands or continuous fibers already formed as they are withdrawn from a source such as a series of packages in a creel, and after such formation of the product, it can be wound directly into a package or can be consumed immediately such as by chopping, formation of a mat, or introduction into a laminate structure. Bonding of such products in spaced zones can be completed in an oven immediately prior to use or by permitting a drying at ambient temperatures, dependent upon the timing for use as well as the type of bonding agent used to effect integration.

The strand product produced can be made according to a wide range of dimensions and proportions. In some instances, for example, the strands may be integrated for one inch in every five to six inches of length of the product, while in others the zones of integration may be three to four inches in every twelve inches of length of the product. The strand products can also be made by gathering individual filaments into a common strand at spaced zones along the length of the product, whereas between the integrated zones the product can be imparted a filamentized form in which each individual filament is somewhat loosely associated with the others in dispersed form. In this respect, the filaments can be held separated as they are being traversed and then grouped intermittently to provide the spaced integration along the product length in the same way that the strands are held separated and then intermittently grouped to produce a fine textured bulk product. In still other arrangements, the smaller diameter strands can be of twisted type in which case the fibers of the strands would be held more integrated while the product itself is only integrated at the spaced points along the length thereof.

The illustrated sizing applicator means 15 is adapted to coat the individual fibers with a suitable sizing or binder substance such as an oil, wax, cellulose derivative, rubber, natural and synthetic resins, starch, gum, fat, fatty acid, or other coating substance, or an emulsion of a suitable substance. By application of such sizing or binder materials discontinuities in the fibers are healed to a large extent by leveling off the valleys and sharp projections. Additionally, the sizing or coating materials perform the function of integrating the fibers together when brought into intimate contact with each other.

When the fibers of a strand are intimately associated in spaced zones while the sizing material is still flowable, it has been found that the intimate association of the fibers in the strand is retained upon subsequent drying of the strand in the package. Similarly, when strands of small diameter are brought into intimate contact with each other for short lengths at spaced points or short zones along the length of a product incorporating the strands, the intimate relationship at the spaced points is retained upon subsequent drying of the strand product. When the binding agent is a sizing material, the integration of strands in the spaced zone is generally such that the strands are separable. That is, the strands can be forcably separated into their individual forms upon or after removal from a package, if desired. The material applied to the product to effect the bonding or integration at the spaced points or zones, however, can also be other than sizing materials. A wide range of bonding materials such as phenolic type resins which upon subsequent curing can effect a solid integration of the fibers in the spaced zones can be utilized to effect a more solid integrated bonding of the spaced compacted zones.

Thus the terms binder or binding agent as herein used are intended to mean both sizing materials and other materials such as resinous adhesives which hold fibers and strands in integrated relationship. By way of example, any number of plastic materials such as plastisol, asphalt, polyester resin, etc., or inorganic materials such as any of a wide variety of metals like lead, zinc, aluminum, copper, etc., can be used to effect such bonding. The bonded relationship can be accomplished on newly formed clean fibers or cleaned fibers or strands by intermittent application of the bonding material on a cyclic basis so that it is applied in the spaced integrated zones only. Alternately, the fibers or strands can be coated with one material and bonded together at the points of intimate contact by another material which, in a sense, locks them together in such zones. Such products can be produced according to this invention by intermittently spraying the bonding agent in the spaced zones on the product in synchronism with the action of intermittently bringing the fibrous forms into intimacy.

FIGURES 10 and 11 illustrate a feeder or a bushing unit adaptable to formation of strands which can be combined into the product of the present invention. The feeder unit is illustrated more clearly in FIGURE 10 and comprises in general a conduit section 40 having flanges 47 at each end and a valved orifice 41 centrally located in its lower portion, which orifice opening is controlled in size by a stopper-like formation at the end of a stem 42 which extends upwardly through an opening in the top of the conduit section. Thus, fluids such as molten glass can be flowed through the conduit section and be allowed to flow out of the valved orifice 41 by regulation of the valve stem 42. Associated with the underside of the conduit section 40 is a compartment or reservoir 43 into which the molten fluid supplied from the conduit section can flow upon the orifice 41 being opened. The reservoir 43 has orificed tips 44 provided in its lowermost surface through which the molten material can flow as streams to be attenuated into fibers in the manner shown in FIGURE 2. A baffle 45 within the reservoir 43 distributes the flowing mass of glass within the reservoir upon release from the conduit section. The baffle acts to cause a circuitous flow so that material introduced within the compartment or reservoir 43 is caused to flow over a greater distance than directly from the conduit section and then through the orifices 4. In this way a greater refinement of the glass is promoted and non-homogeneities such as cords of glass can be broken up within the mass of flowing glass prior to passage through the orifices 44 for formation of fibers. A cooling ring 46 is associated with each flange of the conduit section 40 and acts to restrict or block the flow of molten fluid passing through the conduit section when it is desired to withdraw one of the units from the system within which it is installed.

The units 40 are adapted to combination with other similar units in end for end association to establish a a complete circuit 48 connected to a source of molten materials such as melting tank 50. Units 40 can be arranged in series and bolted together with a bridging conduit section 49 at the ends of two forehearth openings extending from the melting tank 50. Glass can be arranged to flow continuously through the loop circuit 48 while any one of the feeder units can be prevented from flowing streams therefrom by regulation of the valve stem 42 associated therewith.

Each adjacent pair of feeding units, either associated with each other in end to end relationship, or crosswise from each other in the opposing forehearth branches of the loop circuit can be arranged to supply a pair of strands adapted to association with each other in the strand product of the present invention. Three, four, or more strands of adjacently related units can also be combined in a strand product and integrated in spaced zones according to this invention to provide the new product described.

It is apparent from the foregoing that within the scope of the invention, modifications and different arrangements may be made other than is herein disclosed and the present disclosure is illustrative merely, the invention comprehending all variations thereof.

I claim:

1. A method for producing a bulk strand product of fine texture comprising flowing streams of thermoplastic mineral material from a source of said material, attenuating said streams into continuous fibers, applying sizing material to said fibers, dividing said fibers into separate groups, compacting said separate groups into individual strands, intermittently compacting said strands together in intimate side-by-side unitary relation in spaced zones along the length of said product, and drying said grouped strands to effect an integration thereof in said spaced zones.

2. A method for producing a bulk strand product of fine texture comprising flowing streams of thermoplastic mineral material from a source of said material, attenuating said streams into continuous fibers, applying fluid sizing material to each of said fibers in a given zone through which said fibers are drawn, dividing said fibers into separate groups each of a plurality of said fibers, compacting each of said groups of fibers into an integrated strand, moving said strands lineally in separated side by side relationship, intermittently grouping said side-by-side strands together in compacted unitary relationship in zones spaced along their length while said sizing material is still in fluid form, collecting said product into a package, and drying said product while in said package whereby said strand product is integrated into unitary relationship in the spaced zones of strand compaction.

3. A method for producing a bulk strand product of fine texture comprising flowing streams of thermoplastic mineral material from a source of said material, attenuating said streams into continuous fibers, applying fluid sizing material to each of said fibers in a given zone through which said fibers are drawn, dividing said fibers into separate groups of a plurality of said fibers, compacting each of said groups of fibers into an integrated strand, moving said strands lineally in separated side by side generally parallel relationship, winding said strands while in side by side relation into a package, cyclically traversing said strands in said package, grouping said parallelly moving strands in compact unitary relationship at the end of each traverse stroke while said sizing material is still in fluid form, and drying said product while in said package, whereby said strand product is integrated in the spaced zones of strand compaction along the length of said product.

4. A method for producing a bulk strand product of fine texture comprising flowing streams of thermoplastic mineral material from a source of said material, attenuating said streams into continuous fibers, applying sizing material to said fibers, dividing said fibers into separate groups, compacting said separate groups into individual strands, intermittently compacting said strands together in intimate side-by-side relation in spaced zones along the length of said product, drying said grouped strands to effect an integration thereof in said spaced zones, chopping said grouped strands into short discontinuous lengths whereby the discontinuous lengths of individual strands become separated from the grouped strand relationship, and accumulating said discontinuous strand lengths into mat form.

5. A method for producing a bulk strand product of fine texture comprising flowing streams of thermoplastic material from a source of said material, attenuating said streams into continuous fibers, applying sizing material to said fibers, forming separate groups of said fibers, gathering said separate groups into individual continuous strands, moving said continuous strands in generally side-by-side relation to a collection package, intermittently compacting said strands together in a region in advance of said package to establish an intimate unitary relationship of said strands in spaced zones along the length of said product, then collecting said product into said package, and drying said product to effect an integration thereof in said spaced zones.

6. A method for producing a bulk strand product of fine texture comprising flowing streams of thermoplastic material from a source of said material, attenuating said streams into continuous fibers, applying fluid sizing material to each of said fibers in a given zone through which said fibers are drawn, dividing said fibers into separate groups each of a plurality of said fibers, compacting each of said groups of fibers into an integrated strand, moving said strands lineally in separated side-by-side relationship, intermittently grouping said side-by-side strands together in compacted unitary relationship in zones spaced along their length while said sizing material is still in fluid form, collecting said product into layers forming a package, the spacing between said zones of compact unitary relationship being sufficiently short that a plurality of said zones are present in each of said layers, and drying said product while in said package to integrate said strands in said spaced zones of strand compaction.

7. A method for producing a bulk strand product of fine texture comprising flowing streams of thermoplastic material from a source of said material, attenuating said streams into continuous fibers, applying fluid sizing material to each of said fibers in a given zone through which said fibers are drawn, dividing said fibers into separate groups each of a plurality of said fibers, compacting each of said groups of fibers into an integrated strand, moving said strands lineally in separated side-by-side generally parallel relationship, winding said strands while in side-by-side relation into a multi-layered package, cyclically traversing said strands with a number of cyclical traverse strokes as they are being wound in each layer of said package, grouping said parallelly moving strands in compact unitary relationship in each cyclical traverse stroke in a region in advance of said package while said sizing material is still in fluid form, and then drying said product while in said package to integrate said strand product in said spaced zones of strand compaction along the length of said product.

8. A method for producing a bulk strand product of fine texture comprising flowing streams of thermoplastic material from a source of said material, attenuating said streams into continuous fibers, applying sizing material to said fibers, dividing said fibers into separate groups, compacting said separate groups to individual strands, intermittently compacting said strands together in intimate side-by-side relation in spaced zones along the length of said product, collecting said product into a package, drying said grouped strands to effect an integration thereof in said spaced zones, withdrawing said product of integrated grouped strands from said package, chopping said product of grouped strands into short discontinuous lengths whereby the discontinuous lengths of individual strands become separated from the grouped strand relationship, and accumulating said discontinuous strand lengths into mat form.

References Cited in the file of this patent

UNITED STATES PATENTS

| | | |
|---|---|---|
| 2,207,279 | Alderfer | July 9, 1940 |
| 2,272,588 | Simison | Feb. 10, 1942 |
| 2,664,375 | Slayter | Dec. 29, 1953 |
| 2,688,380 | MacHenry | Sept. 7, 1954 |
| 2,705,687 | Petterson et al. | Apr. 5, 1955 |
| 2,777,787 | Bragg | Jan. 15, 1957 |
| 2,778,764 | Morrison | Jan. 22, 1957 |